United States Patent [19]

Gebhard et al.

[11] 4,257,784
[45] Mar. 24, 1981

[54] METHOD AND APPARATUS FOR CLEANING USED AIR FROM SPRAY BOOTHS WHEREIN ARTICLES ARE LACQUERED

[75] Inventors: Rainer Gebhard, Haussen; Hans Wagner, Butzbach, both of Fed. Rep. of Germany

[73] Assignee: Aktiebolaget Svenska Flaktfabriken, Nacka, Sweden

[21] Appl. No.: 26,658

[22] Filed: Apr. 3, 1979

[30] Foreign Application Priority Data

Apr. 3, 1978 [DE] Fed. Rep. of Germany ....... 2814276

[51] Int. Cl.³ ............................................. B01D 47/10
[52] U.S. Cl. ......................................... 55/84; 55/226;
55/241; 98/115 SB; 261/62; 261/112; 261/118; 261/DIG. 54
[58] Field of Search ......... 261/112, 118, 62, DIG. 54; 98/115 SB; 55/223, 226, 240, 241, 83, 84, 93–95

[56] References Cited

U.S. PATENT DOCUMENTS

| 3,138,647 | 6/1964 | Krantz | 261/118 X |
| 3,841,061 | 10/1974 | Pike | 261/118 X |
| 3,884,654 | 5/1975 | DeCrevoisier et al. | 261/118 X |
| 4,045,524 | 8/1977 | Bornert | 261/DIG. 54 |
| 4,057,602 | 11/1977 | Kolm | 261/DIG. 54 |

FOREIGN PATENT DOCUMENTS 2161198 9/1972 Fed. Rep. of Germany ........... 261/118

*Primary Examiner*—Richard L. Chiesa
*Attorney, Agent, or Firm*—Fitzpatrick, Cella, Harper & Scinto

[57] ABSTRACT

For cleaning a flow of used air from a spray booth wherein articles are lacquered, a duct is provided with a first constriction where the flow of used air is brought into contact with washing fluid so as to wet lacquer particles in the used air. Downstream of the first constriction a guide conduit, which has a bend therein deflects the flow of used air and the washing fluid. The guide conduit is provided with a second constriction and after the flow of used air and the washing fluid have been deflected they pass through the second constriction, which is narrower than the first. Turbulence is thus created and the washing fluid is atomized and intimately mixed with the used air.

13 Claims, 1 Drawing Figure

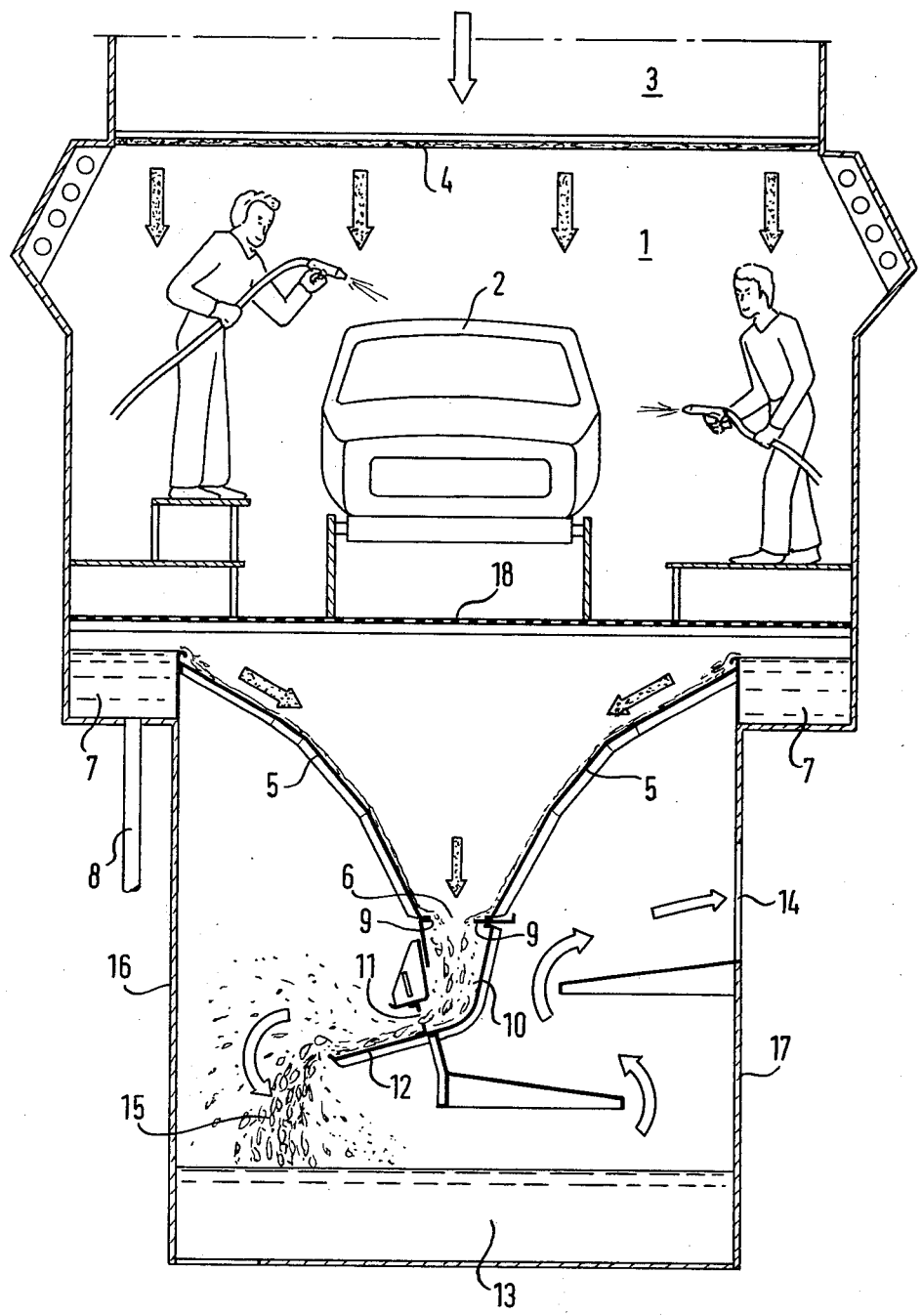

METHOD AND APPARATUS FOR CLEANING USED AIR FROM SPRAY BOOTHS WHEREIN ARTICLES ARE LACQUERED

The invention relates to a method and apparatus for cleaning used air from spray booths wherein articles are lacquered.

It is known from German Offenlegungsschrift No. 21,61,198 to subject the used air to a very intense flow constriction, i.e. to guide the used air through a constriction of very small cross-section, so that washing fluid supplied to the constriction is atomised and mixed intimately with the used air. Subsequently, the mixture of air and fluid thereby obtained is laterally deflected in an arc, whereby the wettened and thus agglomerating lacquer particles in the used air are separated from the air, whereupon the cleaned air is extracted and the fluid is collected and conducted away. Good results may be achieved with the known method in a relatively simple constructive manner.

The object of the invention is to improve further the above-mentioned known method in respect of the degree of separation without increasing the level of noise produced by the flow constriction. Instead, this noise level should be kept as low as possible.

According to one aspect of the invention there is provided a method of cleaning used air from a spray booth wherein articles are lacquered, comprising providing a flow of used air from said spray booth, subjecting said flow of used air to a first constriction, bringing washing fluid into contact with said flow of used air at said first constriction and thereby wetting lacquer particles in said flow of used air, deflecting said flow of used air and said washing fluid after said first constriction, and subjecting said flow of used air and said washing fluid to a second constriction which is narrower then said first constriction whereby to atomise said washing fluid and to mix said washing fluid intimately with said flow of used air.

In another aspect of the invention there is provided apparatus for cleaning used air from a spray booth wherein articles are lacquered comprising a Venturi duct, means providing a first constriction in the duct, means for supplying washing fluid to said constriction, a guide conduit downstream of said constriction, said guide conduit having a bend, and means providing a second constriction in said guide conduit, said second constriction having a smaller cross-section than said first constriction.

The first constriction may be considerably less narrow than the second constriction, whereby less turbulence and consequently a lower noise level is produced thereat. It is true that the second constriction produces a noise level which is just as high as in the known single constriction arrangement, but in the present invention this noise is produced further away from the spray booth. Despite the two constrictions provided according to the present invention, the noise level in the spray booth is therefore lower than that which is produced in the known method and apparatus employing only one flow constriction.

Because the present invention also provides a change of direction for the flow of used air between the two constrictions, the transmission of noise from the second constriction to the spray booth is considerably reduced, so that this causes a further reduction in the noise level in the spray booth. At the same time the washing fluid also mixes more satisfactorily than it would otherwise with the used air and the lacquer particles located therein prior to atomisation at the second constriction. In practice there is between the two constrictions a reaction zone which allows the lacquer particles, which are located in the used air and which are wettened by the washing fluid, a relatively long time to bind together.

The invention is described further, by way of example, with reference to the accompanying schematic drawing of one form of apparatus embodying the invention.

Air which has possibly been filtered is supplied to a spray booth 1, through which articles 2 to be lacquered are passed, by way of an air inlet conduit 3 wherein the air is heated. An air filter 4 extends over the entire ceiling of the spray booth 1 and facilitates uniform distribution of the air over the entire cross-sectional area of the booth.

Provided beneath a base grid 18 of the spray booth is a Venturi duct having two guide walls 5 which slope downwardly towards one another from two longitudinal sides of the spray booth and on which washing fluid is guided to a constriction 6 at the lower end of the guide walls 5. This washing fluid is brought from containers 7 by an overflow process onto the above-mentioned guiding walls and these containers are fed by way of a supply line 8.

In the region of the constriction 6, the fluid runs over inwardly projecting shoulders 9, thus forming a spray as a result of which small lacquer particles located in the used air, which is also conducted through the constriction, have their surfaces wettened by washing fluid.

From this constriction, the used air containing the wettened lacquer particles and the washing fluid flows into a guide conduit 10 which initially extends vertically downwards and then bends almost through 90° to one side. Beyond the bend, a further constriction 11 is provided in this guide conduit. Both the upper constriction 6 and the lower constriction 11 are of variable width but the lower constriction is generally narrower. An intensive atomization of the fluid which is sprayed into the flow of used air in the upper constriction 6 occurs under turbulence in this narrower lower constriction, since the used air is conducted through this at a relatively high speed. A homogeneous mixture of air and fluid (mist) is hereby produced which promotes the binding together of the lacquer particles located in the used air or which leads to an improved separation of these small lacquer particles from the used air. The agglomerated lacquer particles which are thereby separated from the air are conducted away laterally on a guide surface 12 which has a slight downwards incline, whilst the used air is separated from these lacquer particles.

Whilst the agglomerated lacquer particles and the washing fluid fill from the guide surface into a fluid bath in the form of a fluid mist or spray 15 containing the lacquer particles or are flung against a lateral wall 16 facing the surface 12 where they then flow down into the bath, the used air which has been separated from the fluid and the lacquer particles and is thus cleansed passes through the mist or spray of fluid and lacquer, thereby achieving an additional cleansing of the used air until it is extracted through an opening 14 in a lateral wall 17 opposite the wall 16.

As in the embodiment shown, the cross-section of the guide conduit 10 may taper continuously from the upper constriction 6 to the lower constriction 11. The guide surface, which extends from the second constriction 11 and is substantially flat in the embodiment shown, advantageously has at a free end thereof an upturned edge which promotes the lateral hydro-extraction of the washing fluid which contains the lacquer particles. The surface 12 may be provided by a rectilinear pipe socket, the underneath side of the pipe being longer than the upper side of the pipe.

We claim:

1. A method of cleaning used air from a spray booth wherein articles are lacquered, comprising the steps of providing a flow of used air from said spray booth, directing said flow of used air through a first constriction, bringing washing fluid into contact with said flow of used air at said first constriction to thereby wet the lacquer particles in said flow of used air, deflecting said flow of used air and said washing fluid downstream of said first constriction through an angle of approximately 90°, and thereafter subjecting said flow of used air and said washing fluid to a second constriction which is narrower than said first constriction to atomize said washing fluid to a greater extent than any atomization which might occur at the first constriction and to mix said washing fluid intimately with said flow of used air, whereby the noise level from the second constriction is reduced in the spray booth.

2. A method according to claim 1 further comprising the step of forming a spray from said washing fluid at said first constriction such that said flow of used air flows through said spray.

3. A method according to claim 1 further comprising the step of continuously reducing the cross-section of said flow of used air and said washing fluid downstream of said first constriction.

4. A method according to claim 1 further comprising the steps of directing said flow of used air and said washing fluid substantially vertically from said first constriction and, after deflecting said flow of used air and said washing fluid, directing said flow of used air and said washing fluid laterally.

5. A method according to claim 1 further comprising the steps of directing said flow of used air and said washing fluid in a substantially rectilinear manner after said second constriction.

6. A method according to claim 1 further comprising the steps of deflecting said flow of used air and said washing fluid after said second constriction.

7. Apparatus for cleaning used air from a spray booth wherein articles are lacquered, comprising a Venturi duct, means defining a first constriction in the duct, means for supplying washing fluid to said first constriction, wherein the washing fluid mixes with the used air, a guide conduit downstream of said constriction, said guide conduit having a bend of approximately 90°, and means defining a second constriction in said guide conduit downstream of said bend, said second constriction having a smaller cross-section than said first constriction for atomizing the washing fluid to a greater extent than any atomization which might occur at said first constriction, whereby the noise level from the atomization at the second constriction is reduced in the spray booth.

8. Apparatus according to claim 7 further comprising means for adjusting said cross-section of said second constriction.

9. Apparatus according to claim 7 further comprising means for adjusting the cross-sections of said first and second constrictions.

10. Apparatus according to claim 7 wherein said guide conduit tapers between said first constriction and said second constriction.

11. Apparatus according to claim 7 further comprising a substantially flat inclined surface arranged downstream of said second constriction.

12. Apparatus according to claim 11 wherein said surface has an upturned edge.

13. Apparatus according to claim 11 further comprising a rectilinear pipe socket providing said surface, said socket having a longer underneath face than upper face.

* * * * *